United States Patent [19]

Nashiki

[11] Patent Number: 5,801,478

[45] Date of Patent: Sep. 1, 1998

[54] RELUCTANCE TYPE SYNCHRONOUS MOTOR

[75] Inventor: Masayuki Nashiki, Niwa, Japan

[73] Assignee: Okuma Corporation, Nagoya, Japan

[21] Appl. No.: 431,839

[22] Filed: May 1, 1995

[30] Foreign Application Priority Data

May 2, 1994 [JP] Japan ..................... 6-093195

[51] Int. Cl.⁶ ..................................... H02L 1/22
[52] U.S. Cl. .................. 310/261; 310/162; 310/216; 310/217; 310/187
[58] Field of Search ...................... 310/168, 261, 310/162, 254, 163, 164, 106, 156, 216, 217, 187

[56] References Cited

U.S. PATENT DOCUMENTS

| | | | |
|---|---|---|---|
| 2,399,931 | 5/1946 | Lamborn | 310/187 |
| 2,975,310 | 3/1961 | Armstrong et al. | 310/163 |
| 3,007,068 | 10/1961 | Arnold | 310/187 |
| 3,154,708 | 10/1964 | Shaffer | 310/187 |
| 3,842,300 | 10/1974 | Daykin et al. | 310/216 |
| 4,110,646 | 8/1978 | Rao | 310/163 |
| 4,249,099 | 2/1981 | Bhongbhibhat et al. | 310/218 |
| 4,250,424 | 2/1981 | Sento et al. | 310/261 |
| 4,476,408 | 10/1984 | Honsinger | 310/156 |
| 4,698,539 | 10/1987 | Workman | 310/216 |
| 4,748,362 | 5/1988 | Hedlund | 310/168 |
| 4,888,513 | 12/1989 | Fratta | 310/216 |
| 5,010,267 | 4/1991 | Lipo et al. | 310/162 |
| 5,015,903 | 5/1991 | Hancock et al. | 310/168 |
| 5,086,245 | 2/1992 | Sieja et al. | 310/216 |
| 5,214,336 | 5/1993 | Schmidt et al. | 310/254 |
| 5,296,773 | 3/1994 | El-Antably et al. | 310/261 |
| 5,418,415 | 5/1995 | Ishizaki | 310/162 |

*Primary Examiner*—Steven L. Stephan
*Assistant Examiner*—Michael J. Wallace, Jr.
*Attorney, Agent, or Firm*—Fish & Richardson P.C.

[57] ABSTRACT

In a reluctance type synchronous motor, a rotor has magnetic poles which have a low magnetic reluctance in an axial direction of the magnetic poles, and have a high magnetic reluctance toward a circumference of the rotor. The magnetic poles have less components orthogonal to axes thereof, so that armature reaction will be reduced.

7 Claims, 11 Drawing Sheets

RELUCTANCE TYPE SYNCHRONOUS MOTOR

BACKGROUND OF THE INVENTION

1. Field of the Invention

This invention relates to an AC servo motor, and particularly to a synchronous motor known as a reluctance motor.

2. Description of the Prior Art

Conventional control devices for synchronous motors are classified into those which control a synchronous motor by applying a frequency-controlled 3-phase AC voltage/current without detecting a position of a rotor, or those which control the motor by detecting the position and a rotating speed of the rotor, as shown in FIG. 1 of the accompanying drawings.

FIG. 2 exemplifies a double-pole synchronous motor of the prior art, which comprises a stator 27 and a rotor 53. The stator 27 includes U-coils UP and UN, V-coils VP and VN, and W-coils WP and WN for receiving the 3-phase AC. The rotor 53 has salient poles made from a magnetic material. In FIG. 2, an angle RP represents a rotation angle of the rotor 53.

In operation, the circuit of FIG. 1 controls the motor shown in FIG. 2 as described below.

Referring to FIG. 1, a position sensor 54 mechanically connected to the rotor 53 outputs a position signal DS.

A signal indicative of a speed command SI and a speed signal SD detected by a speed sensor 56 are calculated by an adder 51 so as to derive a signal indicative of a speed variation ES. A speed controller 57 performs compensation calculations such as proportional control, integral control and derivative control, thereby obtaining a torque command T.

A field current command circuit 59 inputs a signal indicative of the rotor position RP detected by a rotor position sensor 55 and the speed signal SD, and outputs signals indicative of 3-phase field current commands SFIU, SFIV and SFIW.

It is assumed here that SF denotes amplitude of the field current command signals. The three 3-phase field current command signals are expressed as:

$$SFIU = SF \cdot SIN(RP)$$

$$SFIV = SF \cdot SIN(RP+120°)$$

$$SFIW = SF \cdot SIN(RP+240°)$$

Receiving signals indicative of the torque command T and the rotor position RP, an armature current command circuit 58 outputs signals indicative of 3-phase armature current commands SAIU, SAIV and SAIW.

Assume that SA denotes amplitude of the armature current command signals. The three field current command signals can be expressed as:

$$SAIU = SA \cdot COS(RP)$$

$$SAIV = SA \cdot COS(RP+120°)$$

$$SAIW = SA \cdot COS(RP+240°)$$

Adders 72, 73 and 74 add the signals indicative of the 3-phase field current commands and the signals indicative of the 3-phase armature current commands, thereby outputting signals indicative of 3-phase current commands SIU, SIV and SIW to a current control circuit 60.

The current control circuit 60 amplifies power, and applies driving currents IU, IV and IW to the 3-phase coils U, V and W of the motor.

Thereafter, components of the signals indicative of the 3-phase field magnetic current commands act so as to continuously form a field magnetic flux in the direction of the magnetic poles of the rotor. Components of the signals indicative of the 3-phase armature current commands flow in a direction orthogonal to the foregoing magnetic flux. According to the famous Fleming's rule, power, proportional to a vector product $F = B \times I \times L$, is produced, thereby obtaining torque for rotating the motor, where B denotes vector of field magnetic flux density, I denotes vector having a value proportional to the amplitude SA of the armature current command signal, and L denotes a value proportional to total effective length of windings which intersect an internal flux of the 3-phase coils. The rotational torque is proportional to a value derived from multiplying the vector product F by a cosine of an angle formed by a direction of the vector product F and the rotational direction. Forward torque and backward torque are generated by the foregoing operation, thereby fine-controlling the speed of the synchronous motor.

During a normal operation, the rotor 53 shown in FIG. 2 has not only a small magnetic reluctance in a magnetic flux direction but also a relatively small magnetic reluctance of the two magnetic poles in a rotational direction of the rotor.

The conventional synchronous motor is prone to a problem that the field magnetic flux, produced by the 3-phase field magnetic components in the rotor 53, is disturbed by a current flowing through the armature, i.e. a so-called "armature reaction" occurs. Especially, the larger the armature current, the larger the armature reaction, and the lower the production of torque. In other words, the larger the motor current, the larger the armature reaction, thereby reducing torque.

SUMMARY OF THE INVENTION

According a first aspect of the invention, there is provided a reluctance type synchronous motor comprising: a stator for generating a rotating field; and a rotor being capable of rotating in synchronization with the rotating field. The rotor includes a plurality of magnetic poles having a low magnetic reluctance in an axial direction thereof and having a high magnetic reluctance toward a circumference of the rotor, and a plurality of magnetic paths for connecting adjacent magnetic poles, and having a low reluctance in a direction connecting the adjacent magnetic poles, and having a high magnetic reluctance in a direction orthogonal to the foregoing direction. In the magnetic poles, as it is possible to reduce magnetic flux vector components in the circumferential direction of the rotor, it is accordingly possible to reduce armature reaction.

The rotor may have an uneven peripheral edge, thereby reducing leakage reactance from motor windings.

According to a second aspect of the invention, there is provided a reluctance type synchronous motor comprising: a stator for generating a rotating field; and a rotor being capable of rotating in synchronization with the rotating field. The rotor includes a plurality of magnetic poles, and a plurality of magnetic paths for connecting adjacent magnetic poles. The magnetic paths are magnetically insulated from one another. Thus, in the magnetic poles, it is possible to reduce magnetic flux vector components in the circumferential direction of the rotor, so that armature reaction is reduced. Further, it is possible to efficiently introduce magnetic flux into the magnetic paths so as to improve the efficiency of the motor.

The rotor includes a plurality of thin magnetic steel plates piled in an axial direction of the rotor, and the magnetic paths are portions of the magnetic steel plates other than slit portions.

Each of the magnetic steel plates is a disc having a plurality of slits. The magnetic poles of the rotor are formed because of the presence of slits being parallel to axes thereof near the circumference of the magnetic steel plates. The magnetic paths connecting the magnetic poles are formed because of the presence of the slits arranged in a circumferential direction of the rotor.

It is easy to make slits in thin electromagnetic steel plates. When such thin electromagnetic steel plates having slits are stacked, a rotor having complicated slits can be easily fabricated.

The slits on the magnetic steel plates are filled with a non-magnetic material. This increases a magnetic reluctance and improves isotropic magnetic characteristics.

The rotor comprises a plurality of magnetic steel plates which are stacked with at least one reinforcement plate interposed therebetween. This structure strengthens the rotor having complicated slits.

The rotor may have a plurality of magnetic steel plates which are stacked in parallel to a rotor shaft, and the magnetic steel plates have opposite ends which are parallel to shafts of the magnetic poles and are substantially magnetically insulated from one another. In the rotor, the magnetic paths are magnetically insulated from one another.

In a further aspect of the invention, there is provided a reluctance type synchronous motor comprising: a stator for generating a rotating field, the stator having magnetic poles whose tips are divergent; and a rotor being capable of rotating in synchronization with the rotating field.

DESCRIPTION OF THE PREFERRED EMBODIMENTS

Figure 3:
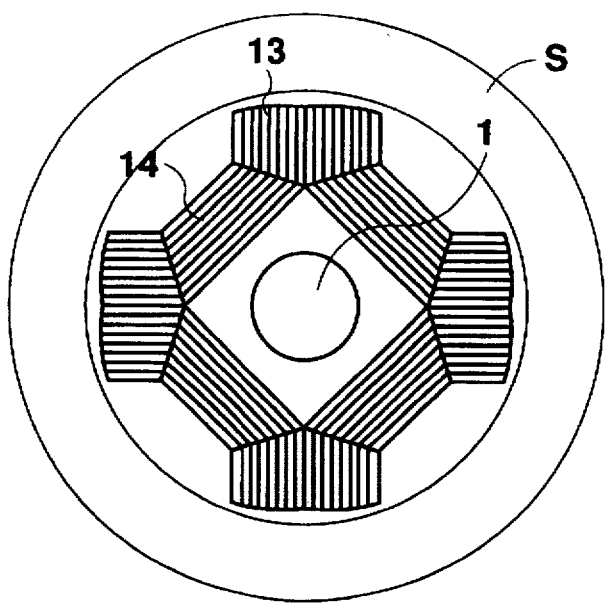
FIG. 3 is a front view of a motor according to a first embodiment of the invention, the motor having isotropic magnetic reluctance.

FIG. 3 is a front view of a four-pole synchronous motor according to a first embodiment of the invention. The motor comprises a stator S for generating a rotating field, a rotor shaft 1, a plurality of magnetic pieces 13, and a plurality of magnetic paths 14 extending between adjacent magnetic pieces 13.

The magnetic pieces 13 are made from a material which has a small magnetic reluctance in a radial direction of the rotor but has a large magnetic reluctance in a rotating direction of the rotor. To be more specific, at the center of each of the magnetic pieces 13, the direction where the magnetic reluctance is minimum coincides with the radial direction of the rotor. Further, this direction is in parallel to the center of the magnetic piece 13. Therefore, at the opposite ends of each magnetic piece 13, the direction where the magnetic reluctance is minimum somewhat deviates from the radial direction of the rotor. The magnetic paths 14 are made from a material having strong magnetic isotropic characteristics similarly to the magnetic pieces 13, and are designed to have a small magnetic reluctance in a direction connecting two adjacent magnetic pieces 13.

Figure 4:
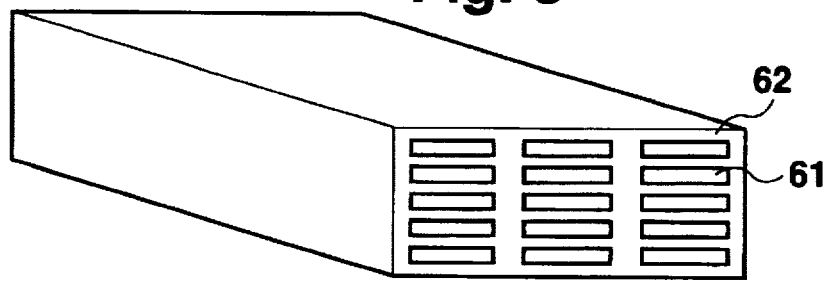
FIG. 4 is a perspective view showing the structure of magnetic pieces and magnetic paths of the motor of FIG. 3.

The magnetic pieces 13 and the magnetic paths 14 are configured as shown in FIG. 4. A plurality of magnetic rods 61 are arranged in parallel to one another and are embedded in a non-magnetic/non-conductive material 62 made from a material such as resin.

The magnetic pieces 13 and magnetic paths 14 may be made from isotropic silicon steel plates which are stacked in directions of the magnetic paths of the magnetic poles.

Figure 5:
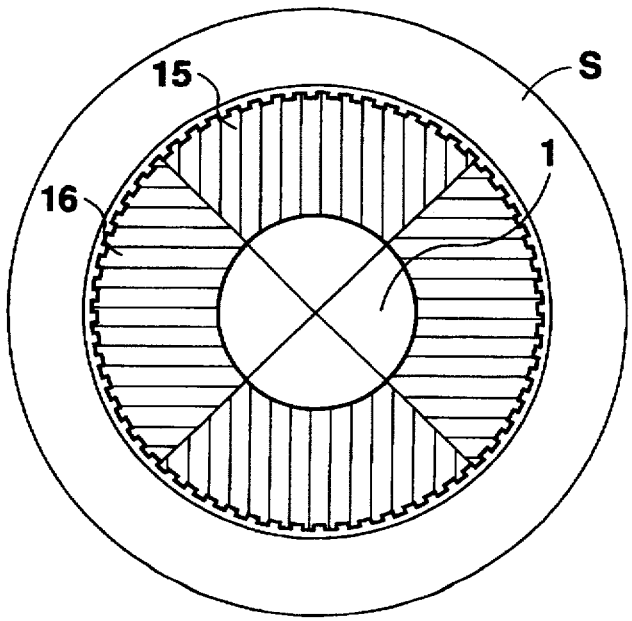
FIG. 5 is a front view of a motor according to a second embodiment, the motor having isotropic characteristics.

A rotor according to a second embodiment is configured as shown in FIG. 5. Magnetic pieces 15 and 16 are made from a material which has a small magnetic reluctance in approximately the radial direction of a rotor and has a large magnetic reluctance in the rotation direction of the rotor, similarly to the magnetic pieces in the first embodiment. Therefore, at the opposite ends of the magnetic piece, the direction where the magnetic reluctance is minimum somewhat deviates from the rotation or radial direction of the rotor. The rotor is not always required to be a salient type as in the rotor of the first embodiment, but can be shaped such that the magnetic reluctance in the radial direction of the rotor periodically varies in the direction toward the circumference of the rotor, and the magnetic reluctance in the rotational direction of the magnetic poles is large. In the second embodiment, directions in which the magnetic pieces 15 and 16 have a small magnetic reluctance are arranged so as to be orthogonal to each other. The directions in which the magnetic pieces 15 and 16 have the small magnetic reluctance are substantially in agreement with the radial direction of the rotor at the center of the rotor, but they deviate in the radial direction of the rotor at positions far from the center of the rotor. Therefore, the magnetic reluctance in the radial direction of the rotor varies in the circumferencial direction of the rotor.

The rotor may have a uneven circumference so as to reduce leakage reactance from motor coils.

The magnetic pieces can be shaped as desired depending upon factors such as ease of machining and assembling, and strength of the material.

Figure 6:
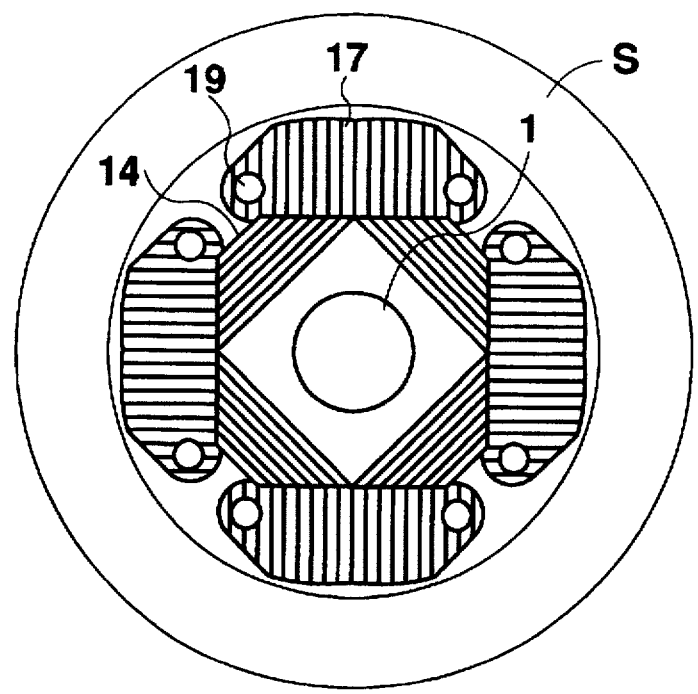
FIG. 6 is a front view of a motor according to a third embodiment.
Figure 7:
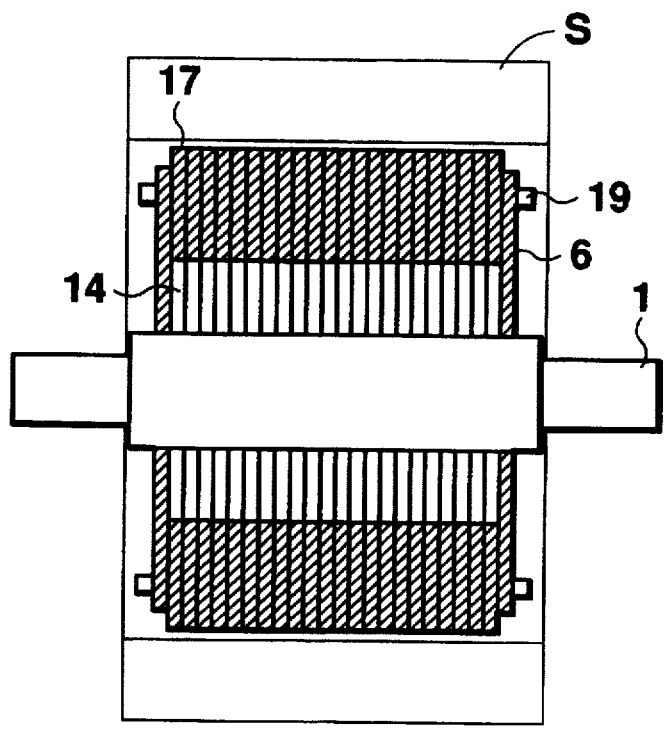
FIG. 7 is an axial cross section showing a stacked state of a rotor in the motor of FIG. 6.

FIGS. 6 and 7 show a rotor according to a third embodiment. In this embodiment, the magnetic pieces 13 (FIG. 3) are modified as magnetic pieces 17 such that they are easily coupled to magnetic paths 14 using support rods 19.

FIG. 7 is a cross section of the rotor cut in the axial direction thereof. In this case, the magnetic pieces 17 are made from stacked magnetic steel plates. In FIG. 7, reference numeral 6 denotes a support disc.

Figure 8:
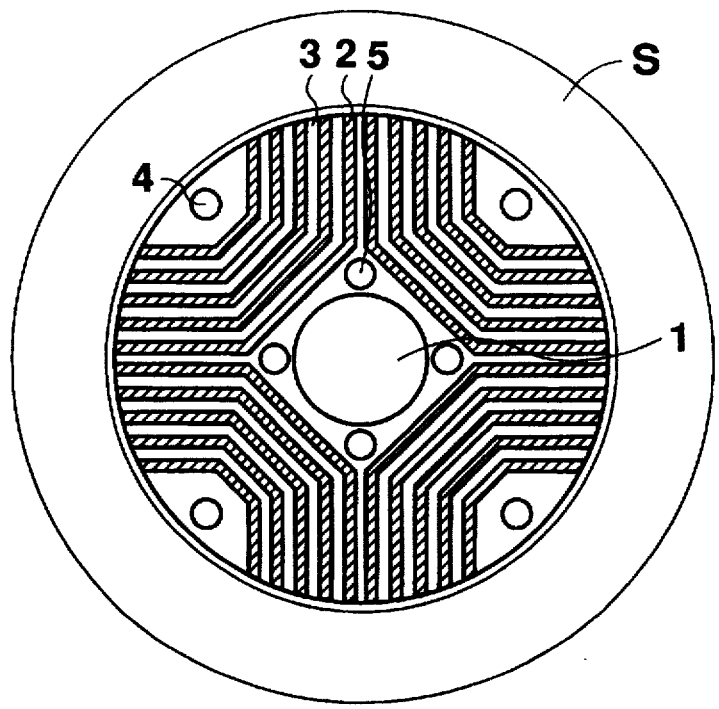
FIG. 8 is a top view of one of the steel plates for a motor according to a fourth embodiment.

A rotor according to a fourth embodiment has a cross section as shown in FIG. 8, taken in a direction at right angles to a rotational center line of the rotor.

Figure 9:
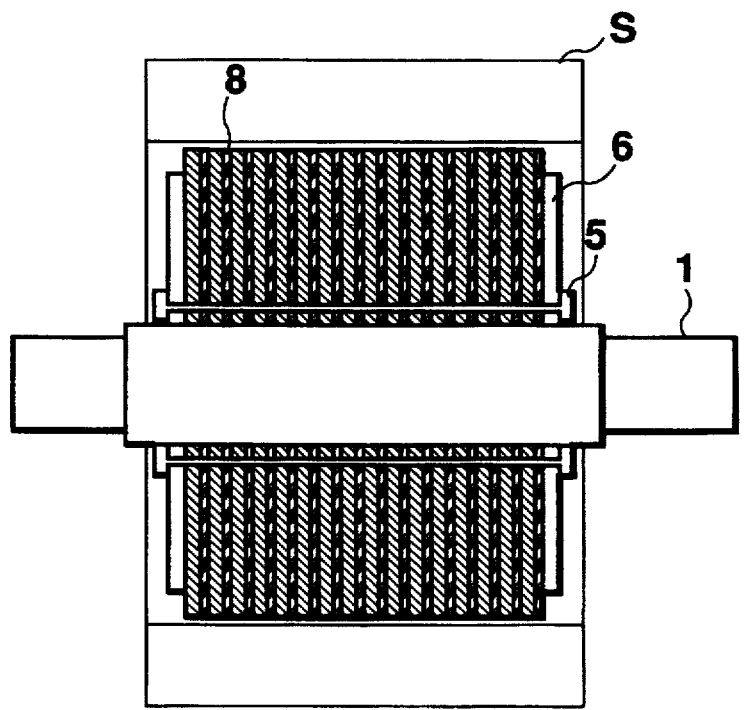
FIG. 9 is an axial cross section showing stacked steel plates.

The magnetic material of each magnetic steel plate is removed as shown by reference numeral 3 so as to have magnetic patterns 2. A plurality of the magnetic steel plates are stacked in the axial direction of the rotor. FIG. 9 is a cross section taken along the center axis of the rotor 1.

The magnetic steel plates are stacked and fixed in a number of ways. Simply, a plurality of the magnetic steel plates may be stacked, and be sandwiched between support rods 4 via the support discs 6.

Alternatively, each magnetic steel plate or a plurality of magnetic steel plates and each fixing plate 8 are alternately stacked one over another, and the steel plates and fixing plates 8 are sandwiched and fixed between the support rods 4 and 5 via the support discs 6.

The rotor shown in FIGS. 8 and 9 has the portions 3 made from a non-magnetic material. Alternatively, the portions 3 may be vacant spaces, where air serves as a non-magnetic material. Magnetic paths 2 communicating with adjacent magnetic poles are arranged in parallel. Therefore, characteristics of the magnetic paths 2 can be considered to be substantially independent. The magnetic paths 2 have a small magnetic reluctance in the direction of the magnetic poles, and have a large magnetic reluctance in the direction orthogonal to the magnetic poles.

The magnetic poles comprising a plurality of the magnetic paths 2 have a large magnetic reluctance in the rotational direction of the rotor, so that a current flowing to one stator coil nearest one magnetic pole, i.e. a disturbance in magnetic flux caused by armature current components of the motor, is minimized.

When the magnetic poles are constituted by a plurality of the magnetic paths as shown in FIG. 8, and when spaces between the magnetic paths and spaces between stator slots are not equal, i.e. the spaces are prime to each other, such a configuration is effective to cancel throttle torque ripples, and a total number of throttle torque ripples can be reduced.

Reduction of the throttle torque ripples may also be accomplished by providing non-uniform spaces between the magnetic paths or non-uniform widths of respective magnetic paths.

Figure 10:
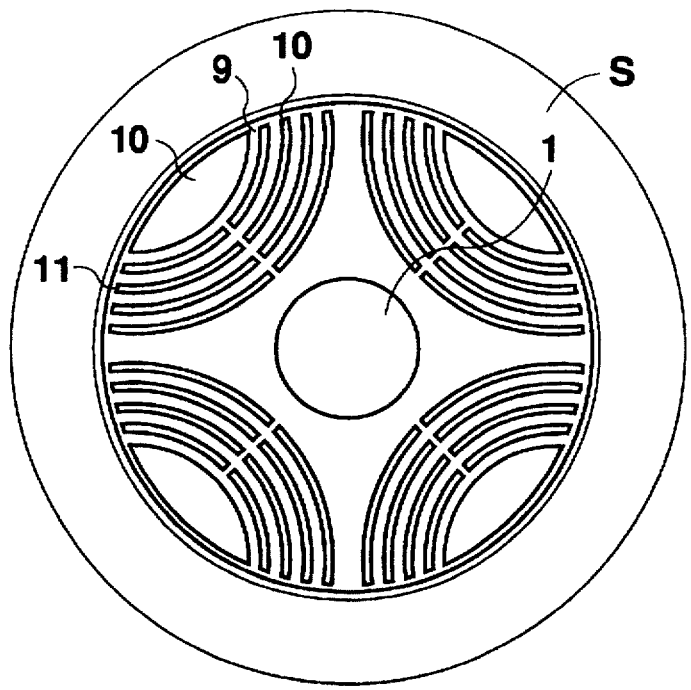
FIG. 10 is a top view of a motor according to a fifth embodiment.

FIG. 10 shows a rotor according to a fifth embodiment. In FIG. 10, reference numeral 1 denotes a rotor shaft, 9 denotes electromagnetic steel plates, and 10 denotes parts of the steel plates 9 where a magnetic material is absent and is filled with air or a material which is made from a non-magnetic material or a material having low magnetic permeability.

Different from the electromagnetic steel plates of FIG. 8, the electromagnetic steel plate of FIG. 10 feature that (1) the periphery of the rotor is unbroken; (2) every two sets of magnetic paths located between two adjacent magnetic poles are connected at a center portion; and (3) the center of the rotor in connection with the rotor shaft and the electromagnetic plates are in close contact with one another.

Magnetic characteristics of the rotor of FIG. 10 are substantially equivalent to those of the rotor of FIG. 8 even if there are some minor differences.

Each of the magnetic paths is connected to its adjacent magnetic path at a center thereof. If a controller of the motor can apply a 3-phase alternating current to the motor in a balanced manner, a combined electromotive power generated by the three sets of windings acts in the direction of the magnetic paths while electromotive power acting in the direction orthogonal to the magnetic paths is reduced. Therefore, even if the magnetic paths are connected as described above, the rotor of FIG. 10 is nearly the same as the rotor of FIG. 8 with respect to the magnetic characteristics of the motor when it is in operation.

The center of each electromagnetic steel plate, i.e. near the rotor shaft 1, is also a magnetic center, where magnetomotive forces acting on the respective magnetic poles are canceled out. Therefore, magnetic characteristics in the vicinity of the center of the rotor are less influential on the distribution of magnetic flux 4 on the surfaces of the magnetic poles.

As can be seen from FIG. 10, the rotor comprises a plurality of electromagnetic steel plates having a continuous circumference is advantageous in the following: a) the electromagnetic steel plates can be cut by a press using dies or processed by etching, and assembled easily without being broken into pieces; 2) the rotor can be strengthened; 3) it is possible to reduce torque ripples which are caused by non-uniform magnetic reluctance due to a discontinuous circumference of the rotor; and 4) it is also possible to reduce wind resistance and noise generated by the rotation of the motor since the rotor has a smooth cylindrical shape.

Further, the structure shown in FIG. 10 is advantageous in that the electromagnetic steel plates in close contact with the rotor shaft can strengthen the rotor, and can be fixed around the rotor by shrink or press fitting process.

Figure 11:
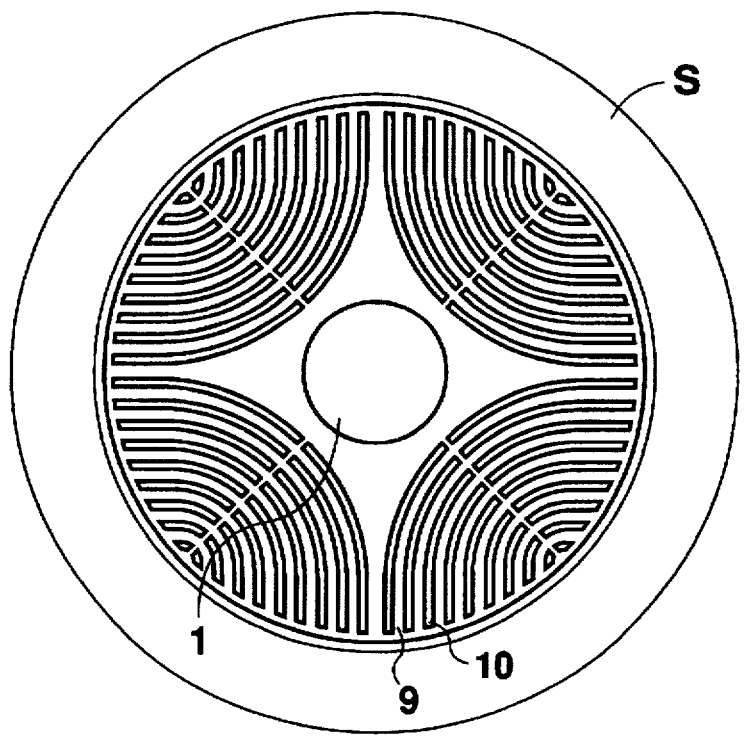
FIG. 11 is a top view of a motor according to a sixth embodiment.

In a sixth embodiment shown in FIG. 11, a plurality of magnetic steel discs are stacked in the direction of the rotation center of the rotor. In FIG. 11, reference numeral 1 denotes a rotor shaft, 9 denotes magnetic paths formed on magnetic steel discs, and 10 denote slits present on the magnetic steel discs. The slits 10 are filled with air, a material having a low magnetic permeability, or a non-magnetic material.

A plurality of magnetic paths are formed between two adjacent magnetic poles. The magnetic paths are magnetically insulated from one another via the slits 10 or the non-magnetic material filled in the slits 10. This structure is effective in increasing a difference between a magnetic reluctance of the magnetic poles in the rotor and a magnetic reluctance at an intermediate portion between adjacent magnetic poles. Thus, large rotational torque can be obtained.

Further, since the magnetic poles and magnetic paths are present along the circumferencial surface of the rotor, magnetic flux of the magnetic poles can be distributed substantially in the shape of a sine wave. This is advantageous in reducing torque ripples contained in the rotational torque of the motor.

The electromagnetic steel plates shown in FIG. 11 have minimum connecting portions between two adjacent magnetic poles, which are provided so as to prevent the plates from being broken into pieces. If the magnetic paths can be suitably fixed to the rotor axis using resin, these connecting portions are magnetically unnecessary. The absence of the connecting portions is electromagnetically preferable.

Figure 16:
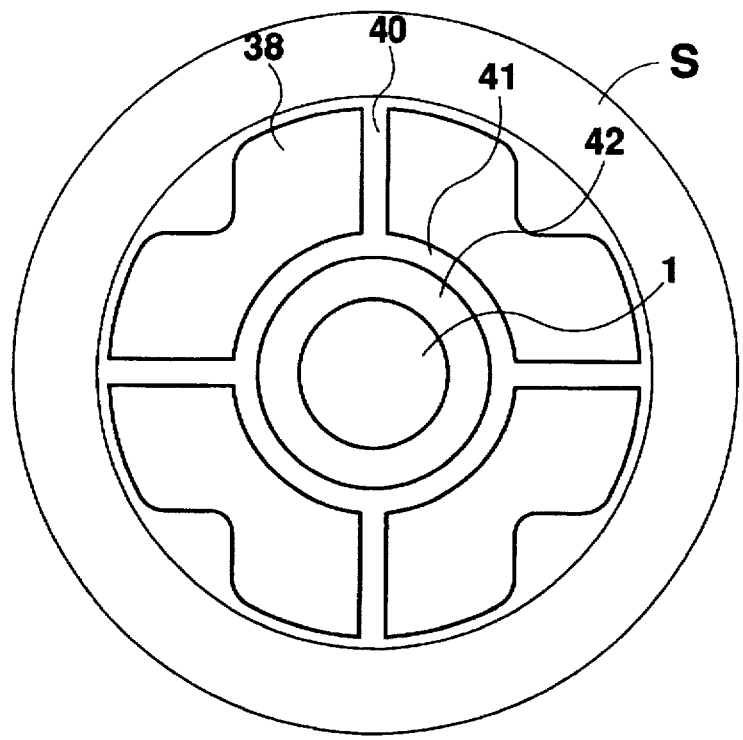
FIG. 16 is a front view of a motor according to a ninth embodiment.

A stator shown in FIG. 16 includes 3- or multiple-phase coils, and is configured similarly to a stator for a general purpose induction motor.

Figure 12:
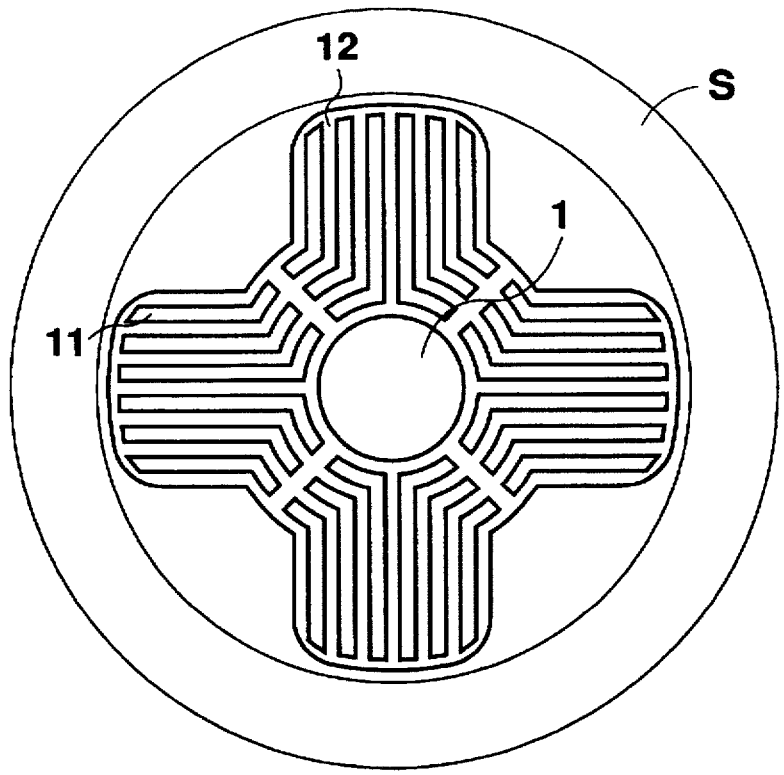
FIG. 12 is a top view of a motor according to a seventh embodiment.

FIG. 12 shows a rotor according to a seventh embodiment. In this embodiment, the magnetic material on the surface of the rotor (shown in FIG. 10) is removed. This configuration is advantageous in that leakage magnetic flux can be reduced. When a non-magnetic material (not shown) is applied between the magnetic poles, it is effective in reducing wind resistance and noise generated by air currents.

Figure 13:
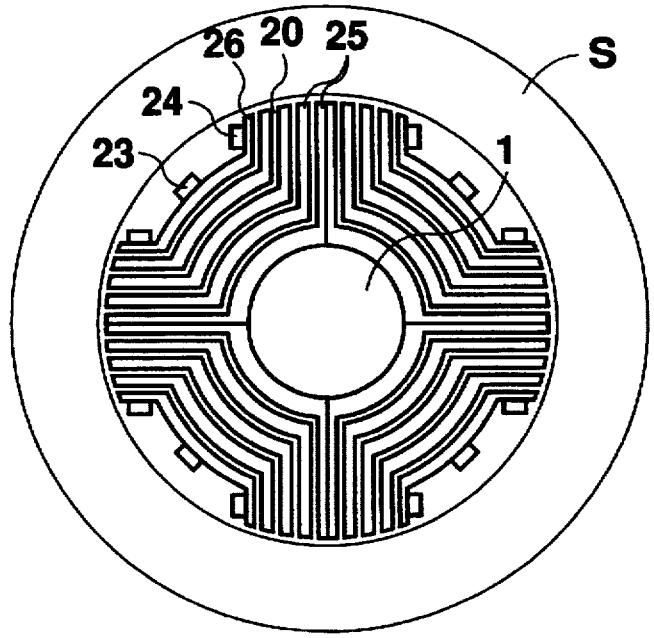
FIG. 13 is a top view of a motor according to an eighth embodiment.
Figure 14:
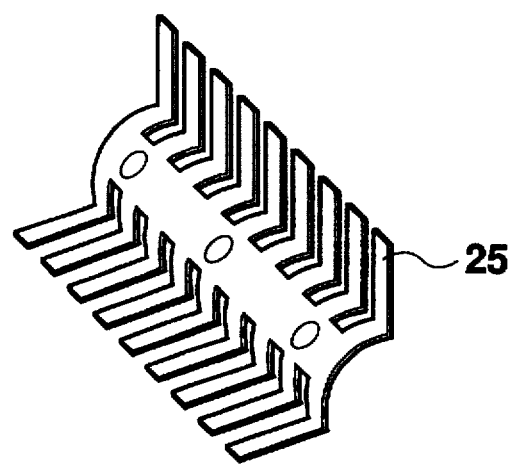
FIG. 14 is a perspective view of an electromagnetic member used in the motor of FIG. 13.
Figure 15:
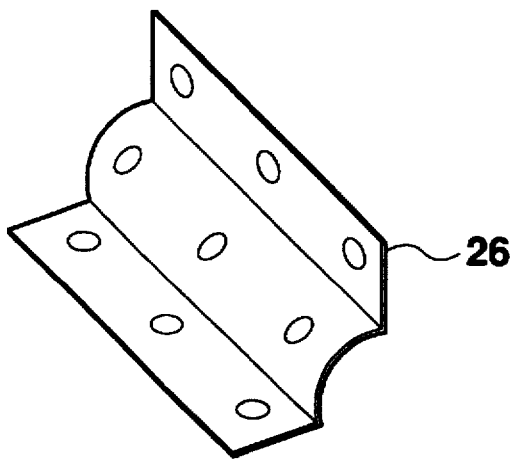
FIG. 15 is a perspective view of a stop.

In an eighth embodiment shown in FIG. 13, a rotor comprises a plurality of isotropic electromagnetic steel plates 25 shaped as shown in FIG. 14 which are stacked in parallel to the center shaft of the rotor. The electromagnetic steel plates 25 are slit so as to prevent eddy currents from being generated when a magnetic flux of the magnetic poles varies in the rotating direction.

Members 20 having a large magnetic reluctance are interposed between every two or every several steel plates 25.

Fixing members 26 are attached on the circumference of the stacked electromagnetic steel plate 25 at positions serving as magnetic poles. When they are made from an electromagnetic steel plate, each of the fixing members 26 functions as a part of the magnetic poles.

Reference numerals 23 and 24 denote bolts for fixing the electromagnetic steel plates 25 and members 20 to the rotor shaft.

According to a ninth embodiment shown in FIG. 16, a rotor has a simplified form of the rotors shown in FIGS. 6 to 8. Each stack of electromagnetic steel plates 38 constitutes a half of a magnetic pole. The electromagnetic steel plates 38 are separated by magnetic insulators 40 located at centers of the respective magnetic poles. The magnetic insulators 40 increase the magnetic reluctance in the rotational direction of the magnetic poles. Reference numeral 41 denotes a magnetic insulator serving to increase the magnetic reluctance in the radial direction of the magnetic poles. The electromagnetic steel plates 38 are fixed to the rotor shaft 1 via a member 42.

The stacked electromagnetic steel plates 38 are sandwiched between suitable members at their top and bottom, and are attached to the rotor shaft 1, or they are attached to the rotor shaft 1 by filling the magnetic insulators 40 and 41 with a material such as resin.

Figure 17:
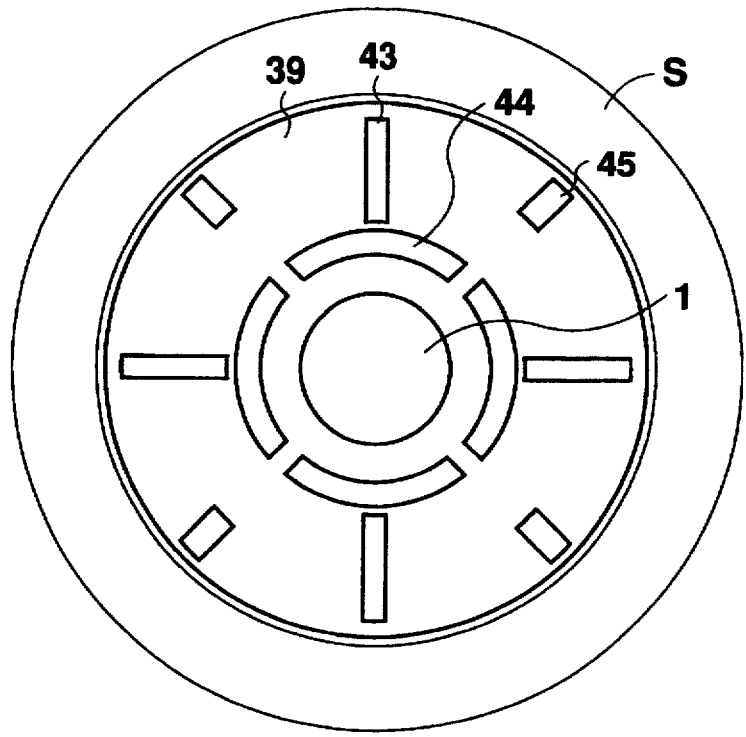
FIG. 17 is a front view of a motor according to a tenth embodiment.

A rotor according to a tenth embodiment is shown in FIG. 17. In this embodiment, the rotor of FIG. 16 is modified so as to facilitate its fabrication. Compared with the rotor of FIG. 16, the rotor of FIG. 17 has a simple structure, i.e. it comprises a plurality of electromagnetic steel plates 39 and a rotor shaft 1. This rotor does not have a member corresponding to the member 42 in the ninth embodiment, but has connecting portions at positions which do not magnetically affect the rotor. Each of the electromagnetic steel plates 39 has a plurality of slits serving as magnetic insulators 43, 44 and 45. The magnetic insulators 45 are positioned between adjacent magnetic poles.

A plurality of stacked electromagnetic plates 39 are attached to the rotor shaft 1 by shrink or press fitting process.

The motors according to the invention have a stator structured as described below.

Figure 18:
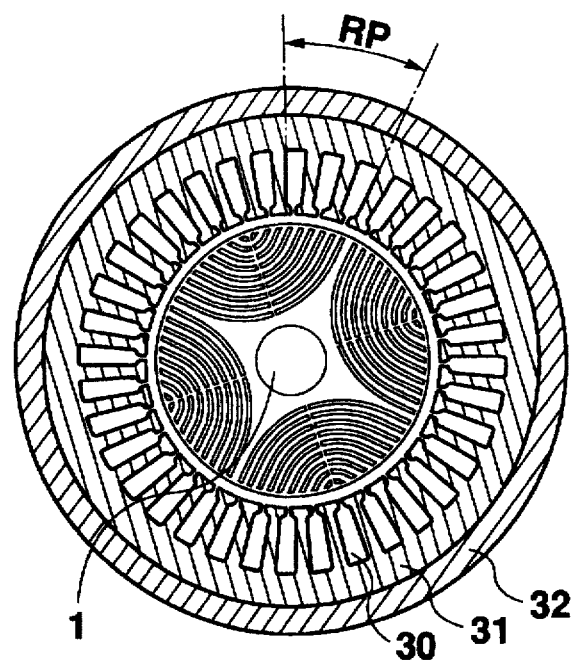
FIG. 18 is a cross section of the motor according to the invention.

FIG. 18 is a cross section of the motor according to the sixth embodiment of the invention, cut in a plane orthogonal to the rotor shaft 1. The rotor is the same as that shown in FIG. 11. In FIG. 18, reference numeral 30 denotes stator slots in which coils are inserted, 31 denotes a stator core made from a plurality of stacked electromagnetic steel plates 31, and 32 denotes a case.

Figure 19:
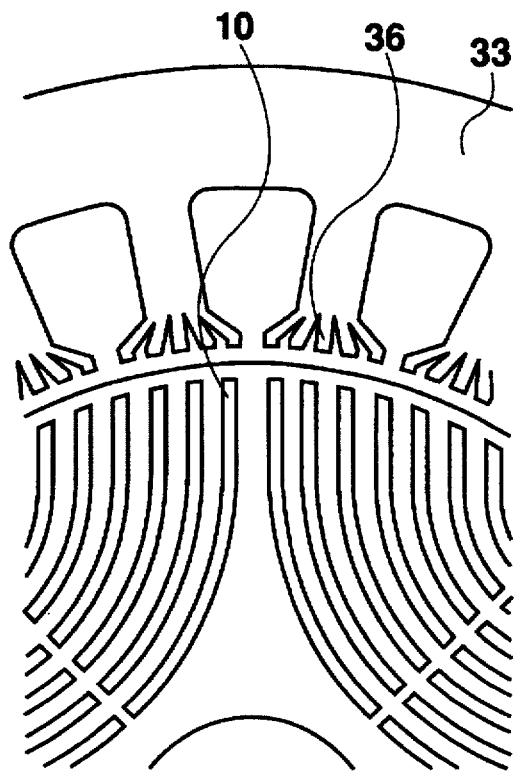
FIG. 19 is an enlarged view of a stator.

FIG. 19 is an enlarged view showing the stator slots 30. Each tip 36 of a tooth of one slot 30 is divided into five portions so as to reduce a difference of magnetic reluctance between the slots and the stator core. Further, it is possible to reduce a difference of magnetic reluctance between the tips of the slots and the surface of the rotor (this magnetic reluctance depends upon a rotating position of the rotor), when a space between each two divided portions of the tip 36 of the slot 30 has a size different from the size of a space between the slits 10 near the periphery of the electromagnetic plate. Thus, it is also possible to reduce local torque ripples of the motor such as throttle ripples. Ideally, the more vacant spaces on the stator surface and the more slits 10 on the peripheral areas of the rotor, the better.

The foregoing relationship of the magnetic reluctances applies only to the magnetic reluctance near the surface where the stator and the rotor confront each other. Not only the magnetic reluctance throughout the synchronous motor but also that of the rotor depend upon the positions of the rotor.

Figure 20:
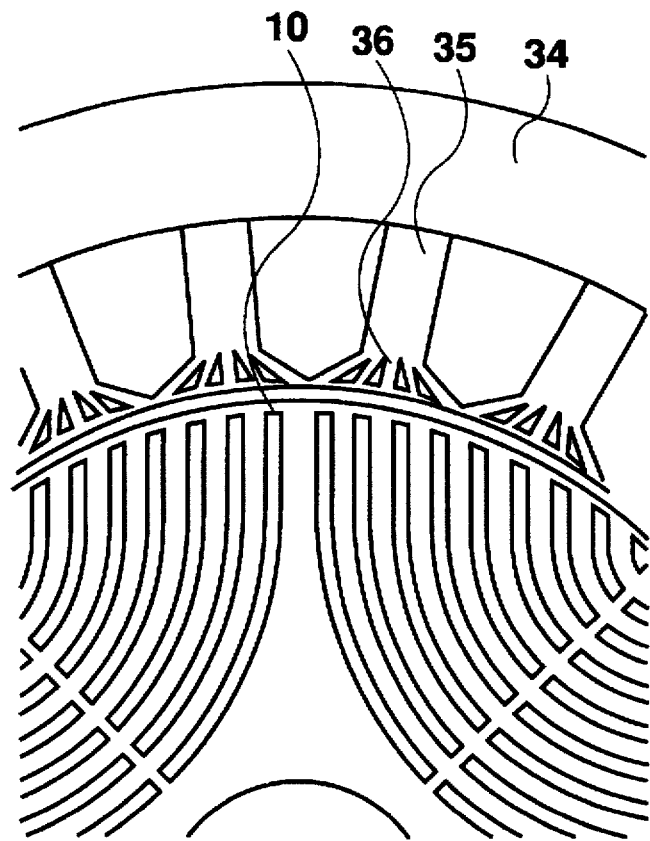
FIG. 20 is an enlarged view of another stator.

Another example of the stator according to the invention is shown in FIG. 20.

In FIG. 20, reference numeral 34 denotes a stator yoke functioning as a part of the magnetic circuit, and reference numeral 35 denotes stator teeth (i.e. magnetic poles). The stator yoke 34 and stator teeth 35 are separable. Motor windings are wound into the slots defined by the teeth 35, and are then assembled into the yoke 34. This structure enables the winding to be wound mechanically or automatically from outside the rotor, and is advantageous to reduce a manufacturing cost of the motor. The yoke 34 and teeth 35 including the windings can be coupled using an adhesive, by the press-fit process, or by engaging uneven portions of the yoke and teeth. Compared with the stator shown in FIG. 19, the adjacent teeth 35 of FIG. 20 are partially connected with one another. This means that the teeth are not separate and can maintain their strength when they are assembled. Further, the teeth have more uniform magnetic reluctance at their divided portions, so that torque ripples can be reduced.

The synchronous motor of the invention operates as described below.

It is assumed here that a relative phase between the magnetic poles of the rotor and a motor current is represented by an electrical angle RRP.

When the RRP is zero (0), the motor current flows to positions where the magnetic poles face. A magnetomotive force is laterally (in the rotating direction of the rotor) applied to each magnetic pole, so that a total magnetic flux of each magnetic pole is zero. Therefore, no rotational torque will be generated. A current component flowing in a direction to make RRP=0 is called "an armature current component IA".

When RRP=90°, the motor current functions to generate magnetic fluxes at the respective magnetic poles. However, since a current component orthogonal to the magnetic fluxes is zero, no rotational torque will be generated. This current component is called "a field current component IF".

The motor current is vector-analyzed and can be expressed by IA and IF.

According to Fleming's rule, torque F generated by the motor is B·I·L. The flux density B is proportional to IF. A current I is IF here, so that torque generated by the motor is ideally proportional to IF·IA.

With the motor of the invention, the armature current component IA prevents the field magnetic flux from being disturbed, so that the motor can generate ideal torque.

Figure 1:
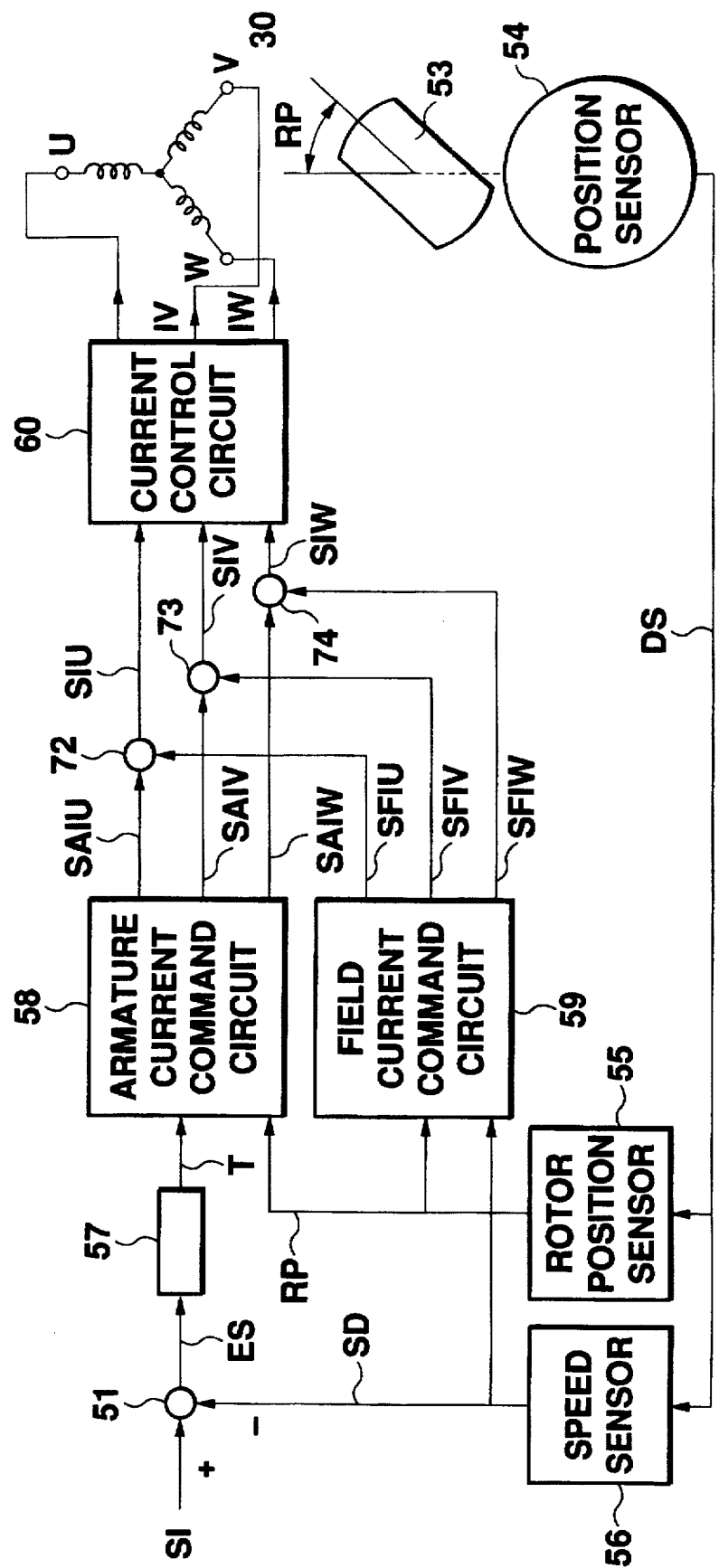
FIG. 1 is a block diagram showing the configuration of a circuit for controlling a conventional reluctance motor.
Figure 2:
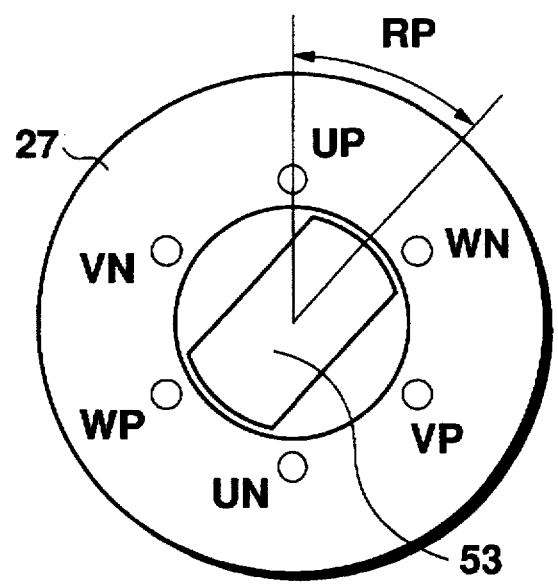
FIG. 2 is a schematic view showing the principle of the conventional motor.

If a desired current can be applied to the windings of the motor under fine control using the circuit configuration as shown in FIG. 1, the field and the armature current can be controlled as desired. The motor of the invention can have good response and can operate efficiently and with a large power factor similarly to a DC motor or a brushless servo motor. Further, peak torque can be attained since a large armature current component does not adversely affect the field.

The invention is applicable to any types of stators and windings.

The foregoing description relates to the motor including an ordinary cylindrical rotor. Further, the invention is applicable to a motor in which a cylindrical rotor and a cylindrical stator confront each other, a motor including a conical rotor and a tapered stator, or the like.

To reduce torque ripples, the magnetic poles of the foregoing stator can be skewed.

The foregoing motors have four magnetic poles. Alternatively, they may have any other number of magnetic poles.

The 3-phase motors have been described. However, the number of phases may be multiple such as 2, 4, or 5.

In a special case, the invention is applicable to a single-phase motor or a single-phase actuator.

According to this embodiment, armature current components seldom disturb the magnetic flux, i.e. the influence caused by armature reaction can be reduced.

With the invention, a current having a large armature component can be applied without any influence on the field, so that it is possible to obtain large peak torque.

What is claimed is:

1. A reluctance type synchronous motor comprising:
   a) a stator for generating a rotating field, wherein the stator includes magnetic poles;
   b) a rotor being capable of rotating in synchronization with the rotating field;
   c) a plurality of magnetic steel plates stacked in an axial direction of the rotor;
   d) a plurality of magnetic paths formed on the plurality of steel plates;
   e) where said magnetic poles includes tips divided into portions which diverge at the interface between the stator and the rotor; and
   f) wherein an interval between the divided portions of the tips differs from an interval between the magnetic paths of the rotor.

2. A reluctance type synchronous motor comprising:
   a stator for generating a rotating field, wherein the stator includes magnetic poles;
   a rotor being capable of rotating in synchronization with the rotating field, the rotor includes:
     a plurality of magnetic steel plates stacked in an axial direction of the rotor, wherein each of the magnetic steel plates have a disc-like circumference;
     a plurality of magnetic paths formed on the magnetic steel plates, wherein said magnetic paths being arranged substantially in parallel to each other between adjacent magnetic poles and being substantially equally spaced along the circumference of the magnetic steel plates; and
     a plurality of slits on the plurality of magnetic steel plates, wherein the magnetic paths are divided by slits except for outer circumference of the magnetic steel plates.

3. The reluctance type synchronous motor of claim 2, wherein the magnetic steel plates include at least one connecting portion between each pair of adjacent magnetic poles, which are disposed in the radial direction of the rotor for connecting adjacent magnetic paths.

4. The reluctance type synchronous motor of claim 3, wherein the rotor further includes non-magnetic plates inserted between every predetermined number of steel plates.

5. The reluctance type synchronous motor of claim 1, wherein:
   the magnetic paths are arranged substantially in parallel to each other between adjacent magnetic poles and are substantially equally spaced along the circumference of the magnetic steel plates; and
   a plurality of slits are provided on the magnetic steel plates, the slits being arranged to divide the magnetic paths except for an outer circumference of the magnetic steel plates.

6. The reluctance type synchronous motor of claim 5, wherein the magnetic steel plates include at least one radially extending connecting portion between each pair of adjacent magnetic poles for connecting adjacent magnetic paths.

7. The reluctance type synchronous motor of claim 6, wherein the rotor further includes non-magnetic plates inserted between every predetermined number of magnetic steel plates.

* * * * *